United States Patent
Kimura et al.

(10) Patent No.: US 10,729,940 B2
(45) Date of Patent: Aug. 4, 2020

(54) GOLF BALL

(71) Applicant: Bridgestone Sports Co., Ltd., Tokyo (JP)

(72) Inventors: Akira Kimura, Chichibushi (JP); Keita Iwasaki, Chichibushi (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 16/206,084

(22) Filed: Nov. 30, 2018

(65) Prior Publication Data
US 2019/0192920 A1 Jun. 27, 2019

(30) Foreign Application Priority Data
Dec. 22, 2017 (JP) .................... 2017-246131

(51) Int. Cl.
| | | |
|---|---|---|
| A63B 37/04 | (2006.01) | |
| A63B 37/00 | (2006.01) | |
| C08L 9/00 | (2006.01) | |
| A63B 102/32 | (2015.01) | |

(52) U.S. Cl.
CPC ...... *A63B 37/0062* (2013.01); *A63B 37/0012* (2013.01); *A63B 37/0043* (2013.01); *A63B 37/0051* (2013.01); *A63B 37/0076* (2013.01); *A63B 37/0092* (2013.01); *C08L 9/00* (2013.01); *A63B 37/0094* (2013.01); *A63B 37/0095* (2013.01); *A63B 37/0096* (2013.01); *A63B 2102/32* (2015.10); *C08L 2205/025* (2013.01); *C08L 2207/53* (2013.01)

(58) Field of Classification Search
USPC ................................. 473/324–350
See application file for complete search history.

(56) References Cited

U.S. PATENT DOCUMENTS

| | | | |
|---|---|---|---|
| 7,367,901 B2 | 5/2008 | Watanabe et al. | |
| 7,429,221 B1* | 9/2008 | Bulpett | A63B 37/0003 473/376 |
| 7,713,146 B2* | 5/2010 | Sullivan | A63B 37/0003 473/376 |
| 7,887,438 B2* | 2/2011 | Sullivan | A63B 37/0003 473/376 |

(Continued)

FOREIGN PATENT DOCUMENTS

| | | |
|---|---|---|
| JP | 2006-230661 A | 9/2006 |
| JP | 2006-289065 A | 10/2006 |
| JP | 2011-115593 A | 6/2011 |

*Primary Examiner* — Alvin A Hunter
(74) *Attorney, Agent, or Firm* — Sughrue Mion, PLLC

(57) ABSTRACT

In a golf ball having a two-layer core consisting of an inner core layer and an outer core layer and a cover of one or more layer, the inner core layer and outer core layer are each formed of a rubber composition made up primarily of a base rubber, the inner core layer has a diameter of not more than 30 mm; and the core has specific hardness ratios (JIS-C hardness/Shore D hardness) at specific points on the cross-section thereof. This golf ball has a reduced spin rate on full shots with a driver and middle irons, thus imparting to an excellent flight performance, and moreover has a good controllability in the short game on approach shots, making it ideal as a golf ball for professional golfers and mid- and high-level amateur golfers.

19 Claims, 3 Drawing Sheets

(56) References Cited

U.S. PATENT DOCUMENTS

| | | | |
|---|---|---|---|
| 8,021,248 B2* | 9/2011 | Sullivan | A63B 37/0044 |
| | | | 473/373 |
| 8,123,629 B2* | 2/2012 | Ladd | A63B 37/0062 |
| | | | 473/376 |
| 8,597,140 B2 | 12/2013 | Komatsu et al. | |
| 8,628,435 B2* | 1/2014 | Sullivan | A63B 37/0031 |
| | | | 473/371 |
| 8,690,712 B2 | 4/2014 | Comeau et al. | |
| 8,764,585 B2* | 7/2014 | Sullivan | A63B 37/0003 |
| | | | 473/376 |
| 9,132,318 B2* | 9/2015 | Sullivan | A63B 37/0092 |
| 9,149,689 B2* | 10/2015 | Sullivan | A63B 37/0051 |

* cited by examiner

GOLF BALL

CROSS-REFERENCE TO RELATED APPLICATION

This non-provisional application claims priority under 35 U.S.C. § 119(a) on Patent Application No. 2017-246131 filed in Japan on Dec. 22, 2017, the entire contents of which are hereby incorporated by reference.

TECHNICAL FIELD

The present invention relates to a golf ball having a two-layer core consisting of an inner core layer and an outer core layer and having a cover of one or more layer.

BACKGROUND ART

Key performance features required in golf balls include distance, controllability, durability and feel at impact. Balls endowed with these qualities in the highest degree are constantly being sought. A succession of golf balls having multilayer constructions typically composed of three pieces have emerged in recent years. By having the golf ball construction be multilayered, it is possible to combine numerous materials of differing properties, enabling a wide variety of ball designs to be obtained in which each layer has a particular function.

For example, JP-A 2003-190331, JP-A 2006-289065, JP-A 2009-95358 and JP-A 2017-46930 describe golf balls in which the core hardness distribution is optimized by forming the core as two layers and varying the hardness from the center to the surface of the core. However, to achieve a greater flight performance and impart higher controllability on approach shots, there remains room for improvement in the construction of these prior-art golf balls.

SUMMARY OF THE INVENTION

It is therefore an object of the present invention to provide a golf ball which can achieve a good distance on shots with a driver (W#1) and a middle iron, and which has a high controllability in the short game.

As a result of extensive investigations, we have discovered that, in a golf ball having a two-layer core consisting of an inner core layer and an outer core layer and having a cover of one or more layer, distinctive effects are obtained by forming the inner core layer and the outer core layer each of a rubber composition composed chiefly of a base rubber and specifying the diameter of the inner core layer, and also, with regard to the cross-sectional hardness of the overall two-layer core, by setting the measured hardness ratio between the JIS-C hardness and Shore D hardness within a specific range. That is, when such a golf ball is used in particular by golfers having a moderate or high head speed (i.e., mid- and high-level amateur golfers and professional golfers), a lower spin rate can be achieved on full shots with a driver and a good distance can be reliably achieved on shots with a middle iron, resulting in excellent flight properties. Moreover, the ball has the proper amount of spin on approach shots, and thus a good controllability.

Accordingly, the invention provides a golf ball having a two-layer core consisting of an inner core layer and an outer core layer and a cover of one or more layer, wherein the inner core layer and outer core layer are each formed of a rubber composition made up primarily of a base rubber; the inner core layer has a diameter of not more than 30 mm; and, letting a center point in a cross-section of the two-layer core be 0% and a surface of the two-layer core be 100%, the core cross-sectional hardness ratio (JIS-C hardness/Shore D hardness) at 0% is at least 1.70 and the core cross-sectional hardness ratio (JIS-C hardness/Shore D hardness) at 100% is not more than 1.65.

In a preferred embodiment of the golf ball of the invention, the hardness difference between the surface and the center of the two-layer core, expressed in terms of JIS-C hardness, is at least 29.

In another preferred embodiment of the inventive golf ball, letting the core cross-sectional hardness ratio (JIS-C hardness/Shore D hardness) at 0% be $T_0$ and the core cross-sectional hardness ratio (JIS-C hardness/Shore D hardness) at 100% be $T_{100}$, the value $T_0$-$T_{100}$ is at least 0.25.

In yet another preferred embodiment, letting the core cross-sectional hardness ratio (JIS-C hardness/Shore D hardness) at a point 50% of the distance from the center point of the two-layer core cross-section to the core surface be $T_{50}$, the value $T_{50}$-$T_{100}$ is at least 0.25.

In still another preferred embodiment, at any point up to a point 50% of the distance from the center point of the two-layer core cross-section to the core surface, the core cross-sectional hardness ratio (JIS-C hardness/Shore D hardness) $T_{0\text{-}50}$ is at least 1.70.

In yet another preferred embodiment, at any point up to the core surface (100% point) from a point 90% of the distance from the center point of the two-layer core cross-section to the core surface, the core cross-sectional hardness ratio (JIS-C hardness/Shore D hardness) $T_{90\text{-}100}$ is not more than 1.65.

In a further preferred embodiment of the inventive golf ball, the rubber composition for the inner core layer contains two or more organic peroxides and the rubber composition for the outer core layer contains one organic peroxide. The rubber composition for the inner core layer preferably includes from 5 to 25 parts by weight of an unsaturated carboxylic acid metal salt per 100 parts by weight of the base rubber and the rubber composition for the outer core layer preferably includes from 26 to 50 parts by weight of an unsaturated carboxylic acid metal salt per 100 parts by weight of the base rubber.

In a still further preferred embodiment, the two-layer core is encased by an intermediate layer, which core and intermediate layer together comprise an intermediate layer-encased sphere, and the surface hardness of the intermediate layer-encased sphere and the surface hardness of the inner core layer have a difference therebetween, expressed in terms of JIS-C hardness, which is at least 25. The intermediate layer is preferably formed of a material containing an ionomer resin having a high acid content of at least 16 wt %.

In another preferred embodiment of the inventive golf ball, the outermost layer of the cover has numerous dimples formed on a surface thereof, the ball has arranged thereon at least one dimple with a cross-sectional shape that is described by a curved line or a combination of straight and curved lines and is specified by steps (i) to (iv) below, and the total number of dimples is from 250 to 380:

(i) letting the foot of a perpendicular drawn from a deepest point of the dimple to an imaginary plane defined by a peripheral edge of the dimple be the dimple center and a straight line that passes through the dimple center and any one point on the edge of the dimple be the reference line;

(ii) dividing a segment of the reference line from the dimple edge to the dimple center into at least 100 points and computing the distance ratio for each point when the distance from the dimple edge to the dimple center is set to 100%;

(iii) computing the dimple depth ratio at every 20% from 0 to 100% of the distance from the dimple edge to the dimple center; and (iv) at the depth ratios in dimple regions 20 to 100% of the distance from the dimple edge to the dimple center, determining the change in depth ΔH every 20% of said distance and designing a dimple cross-sectional shape such that the change ΔH is at least 6% and not more than 24% in all regions corresponding to from 20 to 100% of said distance.

ADVANTAGEOUS EFFECTS OF THE INVENTION

The golf ball of the invention lowers the spin rate on full shots with a driver (W#1) and middle irons and can impart an excellent flight performance. Moreover, it has a high controllability in the short game on approach shots and is thus ideal as a golf ball for, in particular, professional golfers and mid- or high-level amateur golfers.

BRIEF DESCRIPTION OF THE DIAGRAMS

Figure 3A:
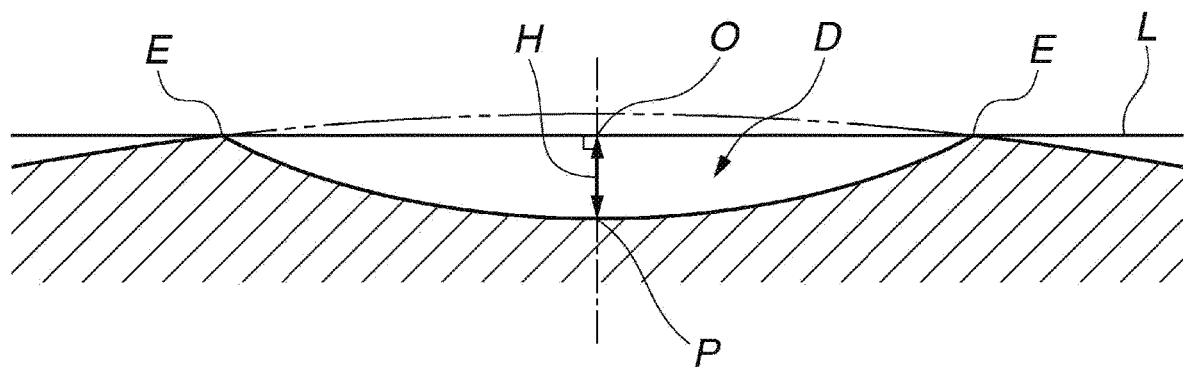
Figure 3B:
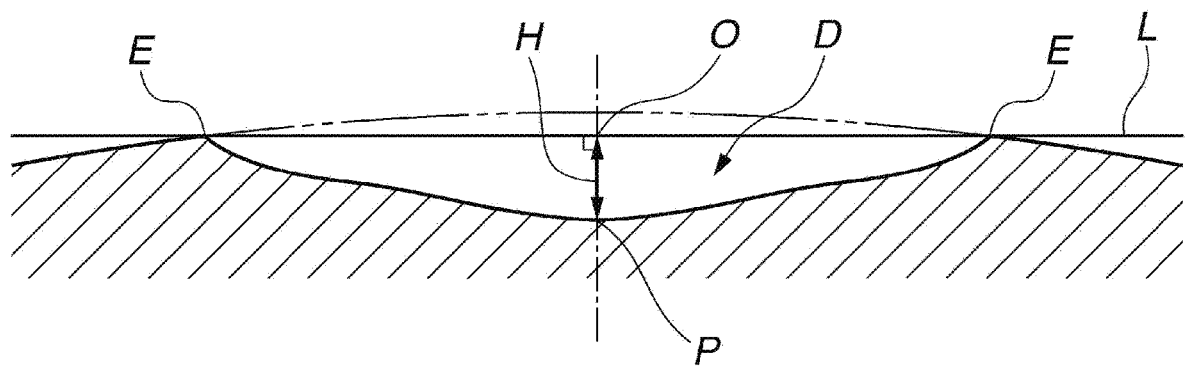

FIGS. 3A and 3B present schematic cross-sectional views of dimples used in the Working Examples and Comparative Examples, FIG. 3A showing a dimple having a circularly arcuate cross-sectional shape and FIG. 3B showing a dimple having a distinctive cross-sectional shape.

DESCRIPTION OF THE PREFERRED EMBODIMENTS

The objects, features and advantages of the invention will become more apparent from the following detailed description taken in conjunction with the appended diagrams.

Figure 1:
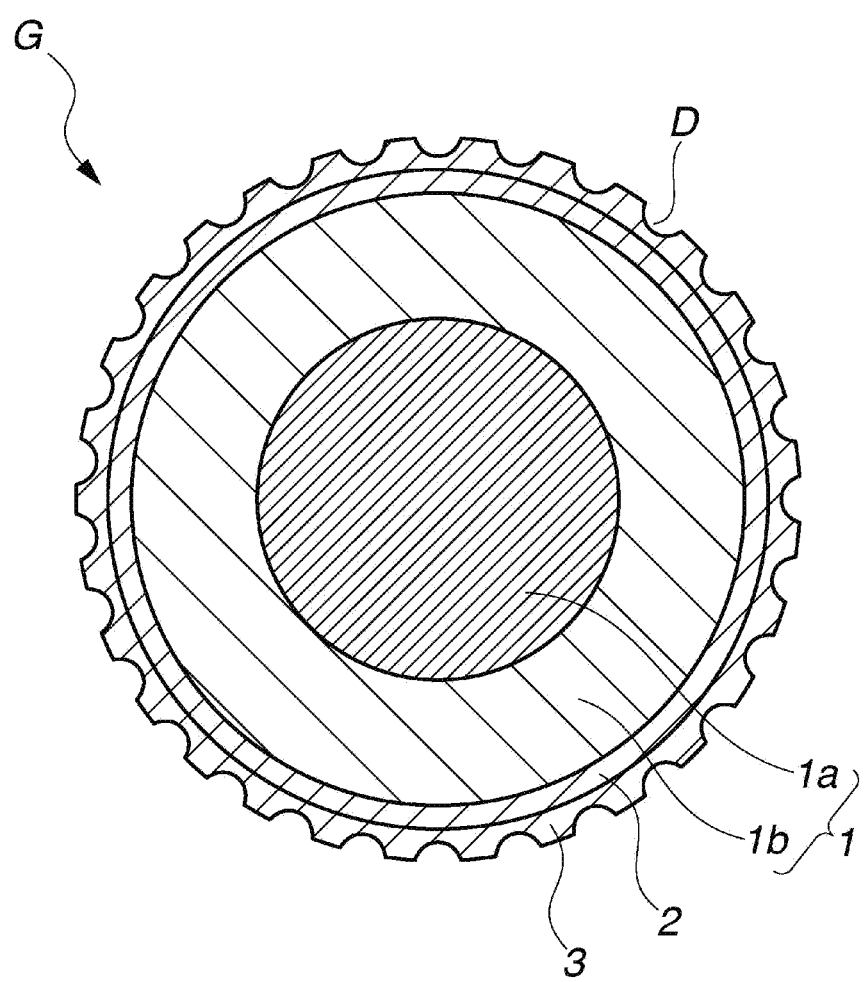
FIG. 1 is a schematic cross-sectional view of a multi-piece solid golf ball according to one embodiment of the invention.

The golf ball of the invention has a core and a cover. Referring to FIG. 1, which shows an embodiment thereof, the ball G has a core 1, a cover 3, and an intermediate layer 2 therebetween. The cover 3, excluding a paint film layer, is positioned as the outermost layer in the layered structure of the golf ball, and may be formed of a single layer or of two or more layers. Numerous dimples D are typically formed on the surface of the cover (outermost layer) 3 so as to enhance the aerodynamic properties of the ball. In this invention, the core 1 is formed of two layers: an inner core layer 1a and an outer core layer 1b. An intermediate layer need not always be provided in the golf ball of the invention. Each layer is described in detail below.

The core in this invention is formed into two layers: an inner core layer and an outer core layer.

The inner core layer has a diameter of preferably at least 21 mm, more preferably at least 22 mm, and even more preferably at least 23 mm. The upper limit is not more than 30 mm, and preferably not more than 25 mm. When the diameter of the inner core layer is too small, the initial velocity of the ball on full shots may decline and the spin rate-lowering effect may be inadequate, as a result of which the intended distance may not be achieved. When the diameter of the inner core layer is too large, the durability to cracking on repeated impact worsens or the spin rate-lowering effect on full shots is inadequate, as a result of which the intended distance is not achieved.

The outer core layer is the layer that directly encases the inner core layer. This layer has a thickness of preferably at least 4 mm, more preferably at least 5 mm, and even more preferably at least 6 mm. The upper limit is preferably not more than 11 mm, more preferably not more than 10 mm, and even more preferably not more than 9 mm. When the outer core layer has a thickness that is too large, the initial velocity of the ball on full shots may decline, as a result of which the intended distance may not be achieved. When the outer core layer has a thickness that is too small, the durability to cracking on repeated impact may worsen, or the spin rate-lowering effect on full shots may be inadequate, as a result of which the intended distance may not be achieved.

In this invention, with regard to the hardness distribution for the overall core consisting of the above two layers, letting the center point in the cross-section of the two-layer core be 0% and the surface of the two-layer core be 100%, the core cross-sectional hardness ratio (JIS-C hardness/Shore D hardness) at 0% and the core cross-sectional hardness ratio (JIS-C hardness/Shore D hardness) at 100% are set in specific ranges. The JIS-C hardness is a measured value obtained in accordance with JIS K6301-1975, and the Shore D hardness is a measured value obtained with a type D durometer in accordance with ASTM D2240-95.

The core cross-sectional hardness ratio (JIS-C hardness/Shore D hardness) at 0%, denoted herein as $T_0$, owing to the high correlation between the hardness ratio on the center side of the core and the spin rate on shots with a driver and middle irons, is at least 1.70, preferably at least 1.75, and more preferably at least 1.80. The upper limit is preferably not more than 2.10, and more preferably not more than 2.00. Outside the above range, the spin rate on full shots with a driver or a middle iron may increase and the desired distance may not be obtained.

The core cross-sectional hardness ratio (JIS-C hardness/Shore D hardness) at 50%, denoted herein as $T_{50}$, owing to the high correlation between the hardness ratio and the spin rate on shots with a driver and middle irons, is preferably at least 1.70, more preferably at least 1.80, and even more preferably at least 1.85. The upper limit is preferably not more than 2.10, and more preferably not more than 2.00. Outside the above range, the spin rate on full shots with a driver or a middle iron may increase and the desired distance may not be obtained.

The core cross-sectional hardness ratio (JIS-C hardness/Shore D hardness) at any point from 0% to 50%, denoted herein as $T_{0\text{-}50}$, is preferably at least 1.70 for the same reasons as above.

The core cross-sectional hardness ratio (JIS-C hardness/Shore D hardness) at 100%, denoted herein as $T_{100}$, owing to the high correlation between the hardness ratio and both the spin rate and durability, is preferably at least 1.30, and more preferably at least 1.40. The upper limit is not more than 1.65, preferably not more than 1.55, and more preferably not more than 1.50. Outside the above range, the spin rate on full shots with a driver or a middle iron may increase or the initial velocity may be insufficient, as a result of which the desired distance may not be obtained. Also, the durability to cracking on repeated impact may worsen and the feel at impact may be too soft.

The core cross-sectional hardness ratio (JIS-C hardness/Shore D hardness) at any point from 90% to 100%, which is denoted herein as $T_{90-100}$, is preferably set to not more than 1.65 for the same reasons as above.

The difference between the core cross-sectional hardness ratio $T_{50}$ at the 50% point and the hardness ratio $T_{100}$ at the 100% point, denoted herein as $T_{50}$-$T_{100}$, owing to the high correlation with the spin rate, is preferably at least 0.25, and more preferably at least 0.35. The upper limit is preferably 0.55. Outside of this range, the spin rate on full shots with a driver or a middle iron may increase, as a result of which the desired distance may not be obtained.

The hardness difference between the surface and center of the core (two-layer core), expressed in terms of JIS-C hardness, is preferably at least 29, and more preferably at least 32. The upper limit is preferably not more than 40, and more preferably not more than 38. When this hardness difference is too large, the durability to cracking on repeated impact may worsen. On the other hand, when this hardness difference is too small, the spin rate on full shots may rise, as a result of which a satisfactory distance may not be obtained.

The core materials described below may be used to obtain the foregoing two-layer core having specific core cross-sectional hardnesses. Unless noted otherwise, the following description applies both to the core material making up the inner core layer and the core material making up the outer core layer.

The inner core layer and outer core layer materials are each composed primarily of a rubber material. The rubber material in the outer core layer encasing the inner core layer may be the same as or different from the inner core layer material. Specifically, a rubber composition can be prepared using a base rubber as the chief component and including, together with this, other ingredients such as a co-crosslinking agent, an organic peroxide, an inert filler and an organosulfur compound. Polybutadiene is preferably used as the base rubber.

The co-crosslinking agent is exemplified by unsaturated carboxylic acids and metal salts of unsaturated carboxylic acids. Specific examples of unsaturated carboxylic acids include acrylic acid, methacrylic acid, maleic acid and fumaric acid, with the use of acrylic acid and methacrylic acid being especially preferred. The metal salts of unsaturated carboxylic acids, although not particularly limited, are exemplified by the above unsaturated carboxylic acids that have been neutralized with a desired metal ion. Specific examples include zinc salts and magnesium salts of methacrylic acid and acrylic acid. The use of zinc acrylate is especially preferred.

The unsaturated carboxylic acid and/or metal salt thereof is included in an amount which is not particularly limited. When used in the rubber composition for the inner core layer, it is preferable for the amount of unsaturated carboxylic acid or a metal salt thereof to be set to from 5 to 25 parts by weight per 100 parts by weight of the base rubber. When used in the rubber composition for the outer core layer, it is preferable for the amount of unsaturated carboxylic acid or a metal salt thereof to be set to from 26 to 50 parts by weight per 100 parts by weight of the base rubber. When the amount included is too large, the spin rate on shots with a driver may rise, as a result of which a satisfactory distance may not be obtained.

The type of organic peroxide is not particularly limited. However, partly in order to keep the cross-sectional hardness gradient in the inner core layer from becoming large, it is preferable to include two or more organic peroxides in the rubber composition for the inner core layer. In the outer core layer, to make the cross-sectional gradient larger, it is preferable to include only one organic peroxide in the rubber composition.

Commercial products may be used as the organic peroxides. Examples of such products that may be suitably used include Percumyl D, Perhexa C-40 and Perhexa 3M (all from NOF Corporation, and Luperco 231XL (from Ato-Chem Co.). The amount of organic peroxide included per 100 parts by weight of the base rubber is preferably at least 0.1 part by weight, more preferably at least 0.3 part by weight, even more preferably at least 0.5 part by weight, and most preferably at least 0.6 part by weight. The upper limit is preferably not more than 5 parts by weight, more preferably not more than 4 parts by weight, even more preferably not more than 3 parts by weight, and most preferably not more than 2.5 parts by weight. When too much or too little is included, it may not be possible to obtain a ball having a good feel, durability and rebound.

Another compounding ingredient typically included with the base rubber is an inert filler, preferred examples of which include zinc oxide, barium sulfate and calcium carbonate. One of these may be used alone, or two or more may be used together. The amount of inert filler included per 100 parts by weight of the base rubber is preferably at least 1 part by weight, and more preferably at least 5 parts by weight. The upper limit is preferably not more than 50 parts by weight, more preferably not more than 40 parts by weight, and even more preferably not more than 35 parts by weight. Too much or too little inert filler may make it impossible to obtain a proper weight and a good rebound.

In addition, an antioxidant may be optionally included. Illustrative examples of suitable commercial antioxidants include Nocrac NS-6 and Nocrac NS-30 (both available from Ouchi Shinko Chemical Industry Co., Ltd.), and Yoshinox 425 (available from Yoshitomi Pharmaceutical Industries, Ltd.). One of these may be used alone, or two or more may be used together.

The amount of antioxidant included per 100 parts by weight of the base rubber can be set to 0 or more part by weight, preferably at least 0.05 part by weight, and more preferably at least 0.1 part by weight. The upper limit is preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable ball rebound and durability.

An organosulfur compound may be included in the outer core layer in order to impart a good resilience. The organosulfur compound is not particularly limited, provided it can enhance the rebound of the golf ball. Exemplary organosulfur compounds include thiophenols, thionaphthols, halogenated thiophenols, and metal salts of these. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. The use of the zinc salt of pentachlorothiophenol is especially preferred.

It is recommended that the amount of organosulfur compound included per 100 parts by weight of the base rubber be more than 0 part by weight, preferably at least 0.05 part by weight, and more preferably at least 0.1 part by weight, and that the upper limit be preferably not more than 5 parts by weight, more preferably not more than 3 parts by weight, and even more preferably not more than 2.5 parts by weight. Including too much organosulfur compound may make a greater rebound-improving effect (particularly on shots with a W#1) unlikely to be obtained, may make the core too soft or may worsen the feel of the ball at impact. On the other hand, including too little may make a rebound-improving effect unlikely.

The methods for producing the inner core layer and the outer core layer are described. The inner core layer may be molded by a method in accordance with customary practice, such as that of forming the inner core layer material into a spherical shape under heating and compression at a temperature of at least 140° C. and not more than 180° C. for a period of at least 10 minutes and not more than 60 minutes. The method used to form the outer core layer on the surface of the inner core layer may involve forming a pair of half-cups from unvulcanized rubber in sheet form, placing the inner core layer within these cups so as to encapsulate it, and then molding under applied heat and pressure. For example, suitable use can be made of a process wherein, following initial vulcanization (semi-vulcanization) to produce a pair of hemispherical cups, the prefabricated inner core layer is placed in one of the hemispherical cups and then covered with the other hemispherical cup, in which state secondary vulcanization (complete vulcanization) is carried out. Alternatively, suitable use can be made of a process which divides vulcanization into two stages by rendering an unvulcanized rubber composition into sheet form so as to produce a pair of outer core layer-forming sheets, stamping the sheets using a die provided with a hemispherical protrusion to produce unvulcanized hemispherical cups, and subsequently covering a prefabricated inner core layer with a pair of these hemispherical cups and forming the whole into a spherical shape by heating and compression at between 140° C. and 180° C. for a period of from 10 to 60 minutes.

Next, the cover material is described.

Various types of thermoplastic resins employed as cover stock in golf balls may be used as the cover material in this invention. For reasons having to do with ball controllability and scuff resistance, it is especially preferable to use a urethane resin material. From the standpoint of mass productivity of the manufactured balls, it is preferable to use as this urethane resin material one that is composed primarily of thermoplastic polyurethane, and especially preferable to use a resin material in which the main components are (I) the thermoplastic polyurethane and (II) the polyisocyanate compound that are described below.

The thermoplastic polyurethane (I) has a structure which includes soft segments composed of a polymeric polyol (polymeric glycol) that is a long-chain polyol, and hard segments composed of a chain extender and a polyisocyanate compound. Here, the long-chain polyol serving as a starting material may be any that has hitherto been used in the art relating to thermoplastic polyurethanes, and is not particularly limited. Illustrative examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly, or two or more may be used in combination. Of these, in terms of being able to synthesize a thermoplastic polyurethane having a high rebound resilience and excellent low-temperature properties, a polyether polyol is preferred.

Any chain extender that has hitherto been employed in the art relating to thermoplastic polyurethanes may be suitably used as the chain extender. For example, low-molecular-weight compounds with a molecular weight of 400 or less which have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these, the chain extender is preferably an aliphatic diol having from 2 to 12 carbon atoms, and is more preferably 1,4-butylene glycol.

Any polyisocyanate compound hitherto employed in the art relating to thermoplastic polyurethanes may be suitably used without particular limitation as the polyisocyanate compound (II). For example, use may be made of one, two or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. However, depending on the type of isocyanate, the crosslinking reactions during injection molding may be difficult to control. In the practice of the invention, to provide a balance between stability at the time of production and the properties that are manifested, it is most preferable to use the following aromatic diisocyanate: 4,4'-diphenylmethane diisocyanate.

Commercially available products may be used as the thermoplastic polyurethane serving as component (I). Illustrative examples include Pandex T-8295, Pandex T-8290, Pandex T-8260 and Pandex T-8283 (all from DIC Bayer Polymer, Ltd.).

As noted above, the polyisocyanate compound serving as component (II) is preferably 4,4'-diphenylmethane diisocyanate, which is an aromatic diisocyanate.

In order to have a necessary and sufficient amount of unreacted isocyanate groups present within the cover resin material, it is recommended that the combined amount of components (I) and (II) be preferably at least 60 wt %, and more preferably at least 70 wt %, of the cover material.

In addition to above components (I) and (II), a thermoplastic elastomer other than the above thermoplastic polyurethanes may also be included as component (III). By including this component (III) in the above resin blend, the flowability of the resin blend can be further improved and properties required of the golf ball cover material, such as resilience and scuff resistance, can be increased.

The compositional ratio of above components (I), (II) and (III) is not particularly limited. However, to fully and successfully elicit the advantageous effects of the invention, the compositional ratio (I):(II):(III) is preferably in the weight ratio range of from 100:2:50 to 100:50:0, and more preferably from 100:2:50 to 100:30:8.

Where necessary, various additives other than the components making up the above thermoplastic polyurethane may be included in this resin blend. For example, pigments, dispersants, antioxidants, light stabilizers, ultraviolet absorbers and internal mold lubricants may be suitably included. In addition, silicone components may be added for the purpose of modifying properties such as heat resistance, cold resistance, weather resistance, lubricity, mold release properties, water repellency, flame retardance and flexibility.

The cover material has a hardness, expressed in terms of Shore D hardness, which is preferably at least 35, and more preferably at least 40. The upper limit is preferably not more than 55, more preferably not more than 53, and even more preferably not more than 50. The sphere obtained by encasing the intermediate layer-encased sphere with the cover has a surface hardness (which hardness is also referred to below as the "ball surface hardness"), expressed in terms of Shore D hardness, which is preferably at least 40, and more preferably at least 50. The upper limit is preferably not more than 62, more preferably not more than 61, and even more preferably not more than 60. When the cover is softer than this range, the spin rate on full shots with a driver (W#1) may rise, as a result of which a good distance may not be obtained. On the other hand, when the cover is harder than this range, the ball may lack spin receptivity in the short game, resulting in a poor controllability, in addition to which the scuff resistance may be poor.

The cover has a thickness which, although not particularly limited, is preferably at least 0.3 mm, and more preferably at least 0.5 mm, but preferably not more than 1.0 mm, and more preferably not more than 0.8 mm. When the cover is thicker than this range, the ball rebound on shots with a driver (W#1) may be insufficient or the spin rate may be too high, as a result of which a good distance may not be obtained. On the other hand, when the cover is thinner than this range, the scuff resistance may worsen or the ball may lack spin receptivity on approach shots, resulting in poor controllability.

It is preferable for the intermediate layer to be thicker than the cover. Specifically, the value obtained by subtracting the cover thickness from the intermediate layer thickness is preferably greater than 0, more preferably at least 0.2 mm, and even more preferably at least 0.3 mm, but preferably not more than 1.4 mm, more preferably not more than 0.9 mm, and even more preferably not more than 0.5 mm. When this value is too large, the feel at impact may be too hard or the ball may lack spin receptivity on approach shots. When this value is too small, the durability to cracking on repeated impact may worsen or the spin rate-lowering effect on full shots may be inadequate, as a result of which the intended distance may not be obtained.

In the practice of this invention, where necessary, an intermediate layer may be provided as a separate layer between the two-layer core and the cover. Any of various types of thermoplastic resins used as cover stock in golf balls may be used here as the intermediate layer material, although the use of an ionomer resin is especially preferred.

A commercial product may be used as the ionomer resin. In particular, of commercial ionomer resins, a high-acid ionomer resin having an acid content of at least 16 wt % may be used alone or may be used as a blend together with an ordinary ionomer resin, thereby providing a high rebound and lowering the spin rate of the ball, which enables a good distance to be achieved on shots with a driver (W#1). The amount of unsaturated carboxylic acid included in the high-acid ionomer resin (i.e., the acid content) is typically at least 16 wt %, preferably at least 17 wt %, and more preferably at least 18 wt %. The upper limit is preferably not more than 22 wt %, more preferably not more than 21 wt %, and even more preferably not more than 20 wt %. When the acid content is too low, the spin rate may rise on full shots, as a result of which the intended distance may not be achieved. On the other hand, when this value is too large, the feel at impact may be too hard or the durability to cracking on repeated impact may worsen.

It is desirable to abrade the surface of the intermediate layer in order to increase adhesion of the intermediate layer material with the polyurethane that is preferably used in the above-described cover material. In addition, following such abrasion treatment, it is preferable to apply a primer (adhesive) to the surface of the intermediate layer or to add an adhesion reinforcing agent to the material.

The specific gravity of the intermediate layer material is generally less than 1.1, preferably between 0.90 and 1.05, and more preferably between 0.93 and 0.99. Outside of this range, the rebound of the overall ball may decrease and so an increased distance may not be achieved, or the durability of the ball to cracking on repeated impact may worsen.

The intermediate layer has a material hardness on the Shore D scale which is preferably at least 61, more preferably at least 62, and even more preferably at least 63. The upper limit is preferably not more than 70, more preferably not more than 68, and even more preferably not more than 66.

The sphere obtained by encasing the core with the intermediate layer (referred to below as the "intermediate layer-encased sphere") has a surface hardness on the Shore scale of preferably at least 67, more preferably at least 68, and even more preferably at least 69. The upper limit is preferably not more than 76, more preferably not more than 74, and even more preferably not more than 72. When the intermediate layer-encased sphere is softer than this range, on full shots with a driver (W#1) or an iron, the rebound may be inadequate or the ball may be too receptive to spin, as a result of which a good distance may not be achieved. On the other hand, when the intermediate layer-encased sphere is harder than this range, the durability of the ball to cracking on repeated impact may worsen or the ball may have too hard a feel at impact.

It is preferable for the surface hardness of the intermediate layer-encased sphere to have a specific relationship with the surface hardness of the inner core layer. That is, the value obtained by subtracting the surface hardness of the inner core layer from the surface hardness of the intermediate layer-encased sphere, expressed in terms of JIS-C hardness, is preferably at least 25, and more preferably at least 30, but is preferably not more than 55, more preferably not more than 50, and even more preferably not more than 45. When this hardness difference is larger than the above range, the durability on repeated impact may worsen. On the other hand, when this hardness difference is smaller than the above range, the ball spin rate-lowering effect on full shots may be inadequate and the desired distance may not be achieved or the controllability on approach shots may worsen.

The intermediate layer has a thickness of preferably at least 0.8 mm, more preferably at least 1.0 mm, and even more preferably at least 1.1 mm. The upper limit is preferably not more than 1.7 mm, more preferably not more than 1.5 mm, and even more preferably not more than 1.3 mm. Outside of this range, the spin rate-lowering effect on shots with a driver (W#1) may be inadequate and a good distance may not be achieved.

The manufacture of golf balls in which the above-described core, intermediate layer and cover are formed as successive layers may be carried out by a customary method such as a known injection molding process. For example, the desired golf ball can be produced by injection-molding the intermediate layer material over the core so as to obtain an intermediate layer-encased sphere, and then injection-molding the cover material over the intermediate layer-encased sphere. Alternatively, the encasing layers may each be formed by first enclosing the sphere to be encased within two half-cups that have been pre-molded into hemispherical shapes, and then molding under applied heat and pressure.

Deflection of Respective Spheres under Specific Loading

It is preferable to set the deflections of the inner core layer, the two-layer core (overall core), the sphere obtained by encasing the core with the intermediate layer and the ball when compressed under a final load of 1,275 N (130 kgf) from an initial load of 98 N (10 kgf) in the respective ranges indicated below.

The inner core layer sphere has a deflection, when compressed under a final load of 1,275 N (130 kgf) from an initial load of 98 N (10 kgf), of preferably at least 4.5 mm, more preferably at least 5.0 mm, and even more preferably at least 5.5 mm. The upper limit is preferably not more than 7.5 mm, more preferably not more than 7.0 mm, and even more preferably not more than 6.5 mm.

The overall core which includes the inner core layer and the outer core layer has a deflection, when compressed under a final load of 1,275 N (130 kgf) from an initial load of 98 N (10 kgf), of preferably at least 2.6 mm, more preferably at least 2.8 mm, and even more preferably at least 3.0 mm. The upper limit is preferably not more than 4.0 mm, more preferably not more than 3.8 mm, and even more preferably not more than 3.6 mm.

The sphere obtained by encasing the core with the intermediate layer (intermediate layer-encased sphere) has a deflection, when compressed under a final load of 1,275 N (130 kgf) from an initial load of 98 N (10 kgf), of preferably at least 2.3 mm, more preferably at least 2.5 mm, and even more preferably at least 2.7 mm. The upper limit is preferably not more than 3.5 mm, more preferably not more than 3.3 mm, and even more preferably not more than 3.1 mm.

The sphere obtained by encasing the intermediate layer-encased sphere with the cover, i.e., the ball itself, has a deflection, when compressed under a final load of 1,275 N (130 kgf) from an initial load of 98 N (10 kgf), of preferably at least 2.0 mm, more preferably at least 2.2 mm, and even more preferably at least 2.4 mm. The upper limit is preferably not more than 3.2 mm, more preferably not more than 3.0 mm, and even more preferably not more than 2.8 mm.

When the deflections of the respective above spheres are larger than the ranges specified for each sphere, the ball may have too soft at feel at impact or the durability of the ball on repeated impact may worsen; also, the initial velocity of the ball on full shots may decrease, as a result of which the intended distance may not be achieved. On the other hand, when the deflections are smaller than the above ranges specified for each sphere, the feel of the ball at impact may be too hard or the spin rate on full shots may be too high, as a result of which the intended distance may not be achieved.

Initial Velocities of Respective Spheres

The relationships between the initial velocity of the overall core, the initial velocity of the intermediate layer-encased sphere and the initial velocity of the ball are preferably set within the ranges indicated below. The initial velocities can be measured using an initial velocity measuring apparatus of the same type as the United States Golf Association (USGA) drum rotation-type initial velocity instrument approved by The Royal and Ancient Golf Club of St. Andrews (R&A). The respective spheres to be measured can be tested in a chamber at a room temperature of 23.9±2° C. after being held isothermally for at least 3 hours at a temperature of 23±1° C.

When an intermediate layer is provided in this invention, the relationship between the initial velocity of the overall core and the initial velocity of the intermediate layer-encased sphere is such that the value obtained by subtracting the initial velocity of the core from the initial velocity of the intermediate layer-encased sphere is preferably at least 0.3 m/s, more preferably at least 0.4 m/s, and even more preferably at least 0.5 m/s. The upper limit is preferably not more than 1.1 m/s, and more preferably not more than 0.8 m/s. When this value is too large, the durability to cracking on repeated impact may worsen. On the other hand, when this value is too small, the spin rate on full shots may rise, as a result of which a satisfactory distance may not be obtained.

Regarding the relationship between the initial velocity of the overall core and the initial velocity of the ball, the value obtained by subtracting the initial velocity of the ball from the initial velocity of the overall core is preferably at least −0.2 m/s, more preferably at least −0.1 m/s, and even more preferably at least 0 m/s. The upper limit is preferably not more than 0.5 m/s, more preferably not more than 0.4 m/s, and even more preferably not more than 0.2 m/s. When this value is too large, the initial velocity of the ball on actual shots may decrease, as a result of which a satisfactory distance may not be obtained. On the other hand, when this value is too small, the spin rate on full shots may rise, keeping a sufficient distance from being achieved.

Numerous dimples may be formed on the cover (outermost layer). The number of dimples arranged on the cover surface, although not particularly limited, is preferably at least 250, more preferably at least 300, and even more preferably at least 320, with the upper limit being preferably not more than 380, more preferably not more than 350, and even more preferably not more than 340. When the number of dimples is higher than this range, the ball trajectory may become low, as a result of which the distance traveled by the ball may decrease. On the other hand, when the number of dimples is lower than this range, the ball trajectory may become high, as a result of which a good distance may not be achieved.

The dimple shapes used may be of one type or may be a combination of two or more types suitably selected from among, for example, circular shapes, various polygonal shapes, dewdrop shapes and oval shapes. When circular dimples are used, the dimple diameter may be set to at least about 2.5 mm and up to about 6.5 mm, and the dimple depth may be set to at least 0.08 mm and up to about 0.30 mm.

In order to fully manifest the aerodynamic properties of the dimples, it is desirable for the dimple coverage ratio on the spherical surface of the golf ball, i.e., the dimple surface coverage SR, which is the sum of the individual dimple surface areas, each defined by the flat plane circumscribed by the edge of a dimple, as a percentage of the spherical surface area of the ball were it to have no dimples thereon, to be set to from 70% to 90%. Also, to optimize the ball trajectory, it is desirable for the value $V_0$, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of a dimple, with respect to the volume of the ball sphere were the ball surface to have no dimples thereon, to be set to at least 0.6% and not more than 1.0%. Outside of the above ranges in these respective values, the resulting trajectory may not enable a good distance to be obtained and so the ball may fail to travel a fully satisfactory distance.

In addition, by optimizing the cross-sectional shape of the dimples, the variability in the flight of the ball can be reduced and the aerodynamic performance improved. Moreover, by holding the percentage change in depth at given positions in the dimples within a fixed range, the dimple effect can be stabilized and the aerodynamic performance improved. The ball has arranged thereon at least one dimple with the cross-sectional shape shown below. A specific example is a dimple having a distinctive cross-sectional shape like that shown in FIG. 3B. FIG. 3B is an enlarged cross-sectional view of a dimple that is circular as seen from above. In this diagram, the symbol D represents a dimple, E represents an edge of the dimple, P represents a deepest point of the dimple, the straight line L is a reference line which passes through the dimple edge E and a center O of the dimple, and the dashed line represents an imaginary spherical surface. The foot of a perpendicular drawn from the deepest point P of the dimple D to an imaginary plane defined by the peripheral edge of the dimple D coincides with the dimple center O. The dimple edge E serves as the boundary between the dimple D and regions (lands) on the ball surface where dimples D are not formed, and corresponds to points where the imaginary spherical surface is tangent to the ball surface (the same applies below). The dimple D shown in FIG. 3B is a circular dimple as seen from above; i.e., in a plan view. The center O of the dimple in the plan view coincides with the deepest point P.

The cross-sectional shape of the dimple D must satisfy the following conditions.

First, as condition (i), let the foot of a perpendicular drawn from a deepest point P of the dimple to an imaginary plane defined by a peripheral edge of the dimple be the dimple center O, and let a straight line that passes through the dimple center O and any one point on the edge E of the dimple be the reference line L.

Next, as condition (ii), divide a segment of the reference line L from the dimple edge E to the dimple center O into at least 100 points. Then compute the distance ratio for each point when the distance from the dimple edge E to the dimple center O is set to 100%. The dimple edge E is the origin, which is the 0% position on the reference line L, and the dimple center O is the 100% position with respect to segment EO on the reference line L.

Next, as condition (iii), compute the dimple depth ratio at every 20% from 0 to 100% of the distance from the dimple edge E to the dimple center O. In this case, the dimple center O is at the deepest part P of the dimple and has a depth H (mm). Letting this be 100% of the depth, the dimple depth ratio at each distance is determined. The dimple depth ratio at the dimple edge E is 0%.

Next, as condition (iv), at the depth ratios in dimple regions 20 to 100% of the distance from the dimple edge E to the dimple center O, determine the change in depth ΔH every 20% of the distance and design a dimple cross-sectional shape such that the change ΔH is at least 6% and not more than 24% in all regions corresponding to from 20 to 100% of the distance.

In this invention, by quantifying the cross-sectional shape of the dimple in this way, that is, by setting the change in dimple depth ΔH to at least 6% and not more than 24%, and thereby optimizing the dimple cross-sectional shape, the flight variability decreases, enhancing the aerodynamic performance of the ball. This change ΔH is preferably from 8 to 22%, and more preferably from 10 to 20%.

Also, to further increase the advantageous effects of the invention, in dimples having the above-specified cross-sectional shape, it is preferable for the change in dimple depth ΔH to reach a maximum at 20% of the distance from the dimple edge E to the dimple center O. Moreover, it is preferable for two or more points of inflection to be included on the curved line describing the cross-sectional shape of the dimple having the above cross-sectional shape.

The golf ball of the invention can be made to conform to the Rules of Golf for play. Specifically, the inventive ball may be formed to a diameter which is such that the ball does not pass through a ring having an inner diameter of 42.672 mm and is not more than 42.80 mm, and to a weight which is preferably between 45.0 and 45.93 g.

EXAMPLES

The following Examples and Comparative Examples are provided to illustrate the invention, and are not intended to limit the scope thereof.

Examples 1 to 6, Comparative Examples 1 to 4

The inner core layer-forming rubber compositions shown in Table 1 below were prepared, following which inner core layers in the respective Examples were produced under the vulcanization conditions shown in the same table. Next, one-half of the outer core layer-forming rubber material was charged into a concave outer core layer mold half, sandwiched between this mold half and a convex mold half of the same radius as the inner core layer and heated at 155° C. for 1 minute, then removed from the mold, thereby producing a half cup-shaped outer core layer. The remaining half of the outer core layer material was similarly formed into a half-cup, and the two half-cups were placed over the molded and vulcanized inner core layer and molded and vulcanized under the vulcanization conditions shown in the table, thereby producing the overall core (inner core layer+outer core layer) in each Example. In Comparative Examples 2 to 4, the core was a single-layer core without an outer core layer.

TABLE 1

|  |  | Working Example | | | | | | Comparative Example | | | |
| --- | --- | --- | --- | --- | --- | --- | --- | --- | --- | --- | --- |
|  |  | 1 | 2 | 3 | 4 | 5 | 6 | 1 | 2 | 3 | 4 |
| Inner | Polybutadiene A | 20 | 20 | 20 | 20 | 20 |  | 80 | 80 | 80 | 80 |
| core | Polybutadiene B | 80 | 80 | 80 | 80 | 80 |  | 20 | 20 | 20 | 20 |
| layer | Metal salt of unsaturated carboxylic acid | 19.1 | 15.3 | 19.1 | 19.1 | 15.3 | 19.1 | 25.5 | 43.7 | 40.0 | 23.5 |
|  | Peroxide (1) | 0.3 | 0.3 | 0.3 | 0.3 | 0.3 | 0.3 | 1.0 | 1.0 | 1.0 | 0.6 |
|  | Peroxide (2) | 0.3 | 0.3 | 0.3 | 0.3 | 0.3 | 0.3 |  |  |  | 0.6 |
|  | Antioxidant | 0.1 | 0.1 | 0.1 | 0.1 | 0.1 | 0.1 | 0.1 | 0.1 | 0.1 | 0.1 |
|  | Barium sulfate | 21.1 | 22.8 | 21.1 | 21.1 | 22.8 | 21.1 | 21.0 |  |  | 20.4 |
|  | Zinc oxide | 4.0 | 4.0 | 4.0 | 4.0 | 4.0 | 4.0 |  | 12.0 | 13.5 | 4.0 |

TABLE 1-continued

|  |  | Working Example | | | | | | Comparative Example | | | |
|---|---|---|---|---|---|---|---|---|---|---|---|
|  |  | 1 | 2 | 3 | 4 | 5 | 6 | 1 | 2 | 3 | 4 |
|  | Zinc salt of pentachlorothiophenol |  |  |  |  |  |  | 0.5 | 0.5 | 0.5 | 0.4 |
|  | Zinc stearate |  |  |  |  |  |  |  |  |  | 2.0 |
|  | Water |  |  |  |  |  |  | 0.9 | 0.9 | 0.9 |  |
|  | Vulcanization conditions Temperature (° C.) | 155 | 155 | 155 | 155 | 155 | 155 | 152 | 152 | 152 | 155 |
|  | Time (min) | 13 | 13 | 13 | 13 | 13 | 13 | 19 | 19 | 19 | 13 |
| Outer core layer | Polybutadiene A | 20 | 20 | 20 | 20 | 20 | 20 | 20 |  |  |  |
|  | Polybutadiene B | 80 | 80 | 80 | 80 | 80 | 80 | 80 |  |  |  |
|  | Metal salt of unsaturated carboxylic acid | 39.2 | 34.9 | 39.2 | 39.2 | 34.9 | 39.2 | 33.2 |  |  |  |
|  | Peroxide (1) |  |  |  |  |  |  |  |  |  |  |
|  | Peroxide (2) | 1.2 | 1.2 | 1.2 | 1.2 | 1.2 | 1.2 | 1.2 |  |  |  |
|  | Antioxidant | 0.1 | 0.1 | 0.1 | 0.1 | 0.1 | 0.1 | 0.1 |  |  |  |
|  | Barium sulfate | 11.8 | 13.7 | 11.8 | 11.8 | 13.7 | 11.8 | 14.5 |  |  |  |
|  | Zinc oxide | 4.0 | 4.0 | 4.0 | 4.0 | 4.0 | 4.0 | 4.0 |  |  |  |
|  | Zinc salt of pentachlorothiophenol | 0.1 | 0.1 | 0.1 | 0.1 | 0.1 | 0.1 |  |  |  |  |
|  | Vulcanization conditions Temperature (° C.) | 155 | 155 | 155 | 155 | 155 | 155 | 155 |  |  |  |
|  | Time (min) | 13 | 13 | 13 | 13 | 13 | 13 | 13 |  |  |  |

The numbers in the core formulations in Table 1 indicate parts by weight. Details on the ingredients in the table are given below.

Polybutadiene A: Available under the trade name "BR 01" from JSR Corporation

Polybutadiene B: Available under the trade name "BR 51" from JSR Corporation

Metal salt of unsaturated carboxylic acid: Zinc acrylate (Wako Pure Chemical Industries, Ltd.)

Organic peroxide (1): Dicumyl peroxide, available under the trade name "Percumyl D" from NOF Corporation Organic peroxide (2): A mixture of 1,1-di(t-butylperoxy) cyclohexane and silica, available under the trade name "Perhexa C-40" from NOF Corporation Antioxidant: 2,6-Di-t-butyl-4-methylphenol, available under the trade name "Nocrac SP-N" from Ouchi Shinko Chemical Industry Co., Ltd.

Barium sulfate: Precipitated Barium Sulfate #300, from Sakai Chemical Co., Ltd.

Zinc oxide: Available as "Zinc Oxide Grade 3" from Sakai Chemical Co., Ltd.

Zinc salt of pentachlorothiophenol: Available from Wako Pure Chemical Industries, Ltd.

Distilled water: Available from Wako Pure Chemical Industries, Ltd.

Zinc stearate: Available under the trade name "Zinc Stearate G" from NOF Corporation Formation of Intermediate Layer and Cover Next, using resin materials No. 1 to No. 4 formulated as shown in Table 2 below, an intermediate layer and a cover were successively injection-molded over the core obtained above, thereby producing golf balls in the respective Examples. Dimples were formed on the surface of the ball cover in each Working Example and Comparative Example at this time. The dimples are subsequently described. In Comparative Example 4, an intermediate layer was not formed; only a cover was formed.

TABLE 2

| Resin material (pbw) | Acid content (%) | No. 1 | No. 2 | No. 3 | No. 4 |
|---|---|---|---|---|---|
| AM7318 | 18 |  | 70 |  |  |
| AM7329 | 15 |  | 15 |  |  |
| Himilan 1706 | 15 | 35 | 15 |  |  |
| Himilan 1557 | 12 | 15 |  |  | 42.5 |
| Himilan 1605 | 15 | 50 |  |  |  |
| Himilan 1601 | 10 |  |  |  | 42.5 |
| Nucrel AN4319 | 8 |  |  |  | 15 |
| T-8290 |  |  |  | 75 |  |
| T-8283 |  |  |  | 25 |  |
| Hytrel 4001 |  |  |  | 11 |  |
| Silicone wax |  |  |  | 0.6 |  |
| Magnesium stearate |  |  |  |  | 0.9 |
| Polyethylene wax |  |  |  | 1.2 |  |
| Isocyanate compound |  |  |  | 7.5 |  |
| Titanium oxide |  |  |  | 3.9 | 3.8 |
| Trimethylolpropane (TMP) |  | 1.1 | 1.1 |  |  |

Trade names of the main materials in the table are as follows.

AM7318, AM7329, Himilan 1706, Himilan 1557, Himilan 1605 and Himilan 1601: Ionomers available from DuPont-Mitsui Polychemicals Co., Ltd.

Nucrel AN4319: An ethylene-methacrylic acid-butyl methacrylate copolymer available from DuPont-Mitsui Polychemicals Co., Ltd.

T-8290, T-8283: MDI-PTMG type thermoplastic polyurethanes available under the trade name Pandex from DIC Covestro Polymer, Ltd.

Hytrel® 4001: A polyester elastomer available from DuPont-Toray Co., Ltd.

Polyethylene wax: Available under the trade name "Sanwax 161P" from Sanyo Chemical Industries, Ltd.

Isocyanate compound: 4,4-Diphenylmethane diisocyanate

Various properties of the resulting golf balls, including the cross-sectional hardnesses at specific distances from the centers to the surfaces of the inner and outer core layers, the diameters of the inner core layer, outer core layer, intermediate layer-encased sphere and ball, the thicknesses and material hardness of each layer, and the surface hardness and deformation (deflection) under specific loading of the respective layer-encased spheres were evaluated by the following methods. The results are presented in Tables 4.

Diameters of Inner Core Layer, Outer Core Layer and Intermediate Layer-Encased Sphere The diameters at five random places on the surface were measured at a temperature of 23.9±1° C. and, using the average of these measurements as the measured value for a single inner core layer, overall core (i.e., inner core layer and outer core layer combined) and intermediate layer-encased sphere, the average diameters for ten test specimens were determined.

Ball Diameter

The diameters at 15 random dimple-free areas on the surface of a ball were measured at a temperature of 23.9±1° C. and, using the average of these measurements as the measured value for a single ball, the average diameter for ten measured balls was determined.

Deflections of Inner Core Layer, Core (Outer Core Layer-Encased Sphere), Intermediate Layer-Encased Sphere and Ball An inner core layer, overall core, intermediate layer-encased sphere or ball was placed on a hard plate and the amount of deflection when compressed under a final load of 1,275 N (130 kgf) from an initial load of 98 N (10 kgf) was measured. The amount of deflection here refers in each case to the measured value obtained after holding the test specimen isothermally at 23.9° C.

Core Cross-Sectional Hardnesses at Specific Positions

The cross-sectional hardnesses at the center of the core and at specific positions in each core were measured by perpendicularly pressing the indenter of a durometer against the region to be measured in the flat cross-sectional plane obtained by hemispherically cutting the inner core layer or the outer core layer that includes the inner core layer. With regard to the cross-sectional hardness at specific positions in each core, letting T be the distance from the core center to the core surface (i.e., the core radius), 0% be the center of the inner core layer and 100% be the surface of the outer core layer, the distance T from the center was divided into 10% sections and the cross-sectional hardness at each 10% point was measured. These hardnesses were measured on the JIS-C hardness scale in general accordance with JIS K6301-1975 and with a type D durometer (Shore D) in general accordance with ASTM D2240-95. It should be noted that because, as described above, measurement was carried out after cutting the cores into hemispheres, the thickness and shape of the specimens used in measurement here differ from the thicknesses and shapes set forth in these standards.

Figure 2:
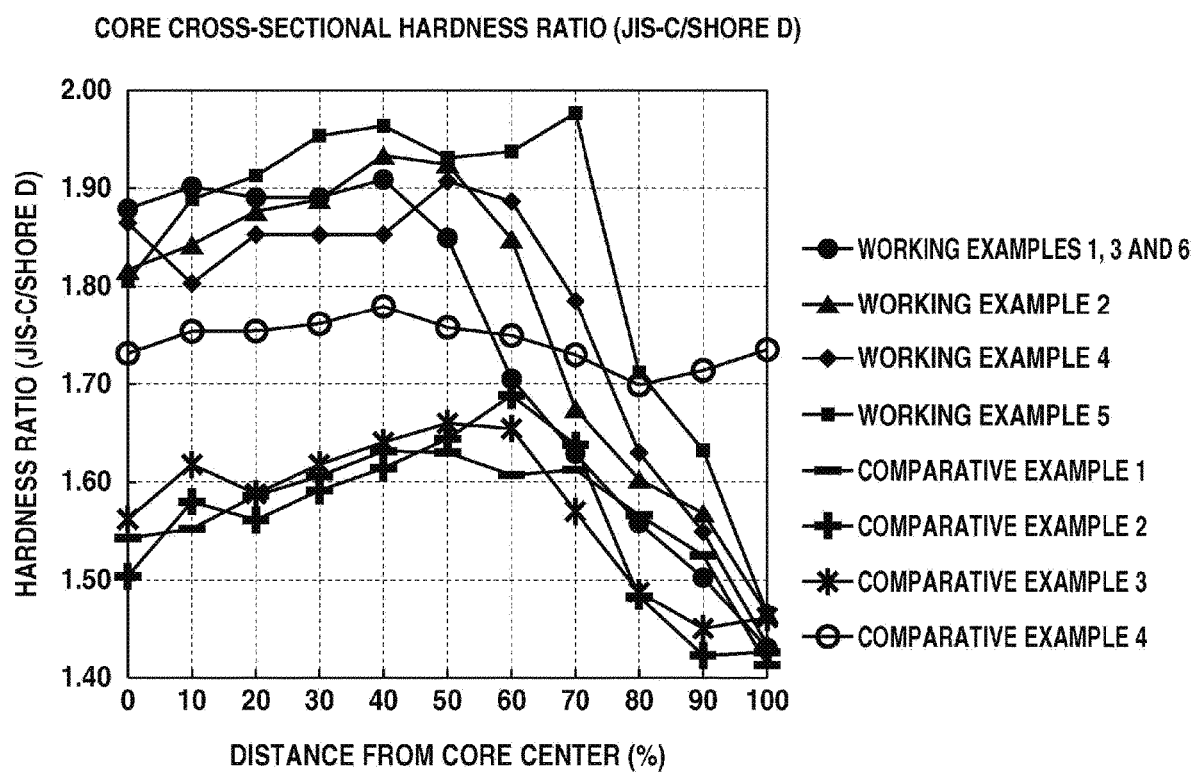
FIG. 2 is a graph showing, for the cores obtained in the Working Examples and Comparative Examples, the relationship between the distance from the core center and the core cross-sectional hardness ratio (JIS-C hardness/Shore D hardness).

The measured hardnesses and the core cross-sectional hardness ratios (JIS-C hardness/Shore D hardness) at each 10% of the distance from the core center to the core surface are presented in Table 4. FIG. 2 shows a graph of the relationship between the distance from the core center and the core cross-sectional hardness ratio.

Material Hardnesses of Intermediate Layer and Cover

The intermediate layer and cover-forming resin materials were molded into sheets having a thickness of 2 mm and left to stand for at least two weeks, following which the Shore D hardnesses were measured in general accordance with ASTM D2240-95.

Surface Hardnesses of Intermediate Layer-Encased Sphere and Ball

Measurements were taken by pressing the durometer indenter perpendicularly against the surface of the intermediate layer-encased sphere or ball (cover). The surface hardness of the ball (cover) is the measured value obtained at dimple-free places (lands) on the ball surface. The Shore D hardnesses were measured with a type D durometer in general conformity with ASTM D2240-95. The JIS-C hardnesses of the intermediate layer-encased spheres were also measured.

Initial Velocities of Core, Intermediate Layer-Encased Sphere and Ball

The initial velocities were measured using an initial velocity measuring apparatus of the same type as the USGA drum rotation-type initial velocity instrument approved by the R&A. The cores, intermediate layer-encased spheres and balls, collectively referred to below as "spherical test specimens," were held isothermally in a 23.9±1° C. environment for at least 3 hours, and then tested in a room temperature (23.9±2° C.) chamber. The spherical test specimens were hit using a 250-pound (113.4 kg) head (striking mass) at an impact velocity of 143.8 ft/s (43.83 m/s). One dozen spherical test specimens were each hit four times. The time taken for the test specimen to traverse a distance of 6.28 ft (1.91 m) was measured and used to compute the initial velocity (m/s). This cycle was carried out over a period of about 15 minutes.

Dimples

Two families of dimples were used on the ball surface: A and B. Family A includes four types of dimples, details of which are shown in Table 3. The cross-sectional shape of these dimples is shown in FIG. 3A. Family B dimples include four types of dimples, details of which are shown in the same table. The cross-sectional shape of the latter dimples is shown in FIG. 3B.

In the cross-sectional shapes in FIGS. 3A and 3B, the depth of each dimple from the reference line L to the inside wall of the dimple was determined at 100 equally spaced points on the reference line L from the dimple edge E to the dimple center O. The results are presented in Table 3.

Next, the change in depth ΔH every 20% of the distance along the reference line L from the dimple edge E was determined. These values as well are presented in Table 3.

TABLE 3

| | Dimple type | | No. 1 | No. 2 | No. 3 | No. 4 |
|---|---|---|---|---|---|---|
| Family A | Number of dimples | | 240 | 72 | 12 | 14 |
| | Diameter (mm) | | 4.3 | 3.8 | 2.8 | 4.0 |
| | Depth at point of maximum depth (mm) | | 0.14 | 0.15 | 0.15 | 0.16 |
| | Dimple depths at each point (mm) | 20% | 0.05 | 0.05 | 0.06 | 0.06 |
| | | 40% | 0.09 | 0.10 | 0.10 | 0.11 |
| | | 60% | 0.12 | 0.13 | 0.13 | 0.13 |
| | | 80% | 0.14 | 0.14 | 0.14 | 0.15 |
| | | 100% | 0.14 | 0.15 | 0.15 | 0.16 |
| | Change in dimple depth (%) | 0%–20% | 35 | 37 | 37 | 38 |
| | | 20%–40% | 30 | 33 | 31 | 29 |
| | | 40%–60% | 21 | 17 | 18 | 17 |
| | | 60%–80% | 11 | 10 | 10 | 11 |
| | | 80%–100% | 4 | 4 | 3 | 5 |
| | SR (%) | | 79 | | | |
| | VR (%) | | 0.9 | | | |
| | Percent of dimples having specified shape | | 0 | | | |
| Family B | Number of dimples | | 240 | 72 | 12 | 14 |
| | Diameter (mm) | | 4.3 | 3.8 | 2.8 | 4.0 |
| | Depth at point of maximum depth (mm) | | 0.15 | 0.16 | 0.17 | 0.16 |
| | Dimple depths at each point (mm) | 20% | 0.06 | 0.07 | 0.07 | 0.07 |
| | | 40% | 0.08 | 0.09 | 0.09 | 0.09 |
| | | 60% | 0.11 | 0.11 | 0.12 | 0.11 |
| | | 80% | 0.13 | 0.14 | 0.15 | 0.14 |
| | | 100% | 0.15 | 0.16 | 0.17 | 0.16 |
| | Change in dimple depth (%) | 0%–20% | 41 | 41 | 41 | 41 |
| | | 20%–40% | 15 | 15 | 15 | 15 |
| | | 40%–60% | 15 | 15 | 15 | 15 |
| | | 60%–80% | 19 | 19 | 19 | 19 |
| | | 80%–100% | 10 | 10 | 10 | 10 |

TABLE 3-continued

| Dimple type | No. 1 | No. 2 | No. 3 | No. 4 |
|---|---|---|---|---|
| SR (%) | | | 80 | |
| VR (%) | | | 0.9 | |
| Percent of dimples having specified shape | | | 100 | |

Definitions of the dimple diameter, depth, SR and VR in Table 3 are given below.

Diameter: Diameter (mm) of flat plane circumscribed by edge of dimple.
Depth: Maximum depth (mm) of dimple from flat plane circumscribed by edge of dimple.
SR: Sum of individual dimple surface areas, each defined by flat plane circumscribed by dimple edge, as a percentage of spherical surface area of ball were it to have no dimples thereon.
VR: Sum of volumes of individual dimples, each formed below flat plane circumscribed by dimple edge, as a percent of volume of ball sphere were it to have no dimples thereon.

TABLE 4

| | | Working Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Inner core layer | Material | rubber | rubber | rubber | rubber | rubber | rubber | rubber | rubber | rubber | rubber |
| | Diameter (mm) | 23.4 | 23.3 | 23.4 | 28.7 | 28.7 | 23.4 | 23.5 | 38.7 | 38.6 | 39.3 |
| | Weight (g) | 7.8 | 7.8 | 7.8 | 14.4 | 14.3 | 7.8 | 7.9 | 35.1 | 35.0 | 36.8 |
| | Deflection (mm) | 5.4 | 6.4 | 5.4 | 5.6 | 6.7 | 5.4 | 5.0 | 2.9 | 3.6 | 4.1 |
| | Surface hardness (JIS-C) | 69 | 62 | 69 | 68 | 60 | 69 | 74 | 91 | 89 | 77 |
| Outer core layer | Material | rubber | rubber | rubber | rubber | rubber | rubber | rubber | | | |
| | Thickness (mm) | 7.6 | 7.7 | 7.6 | 5.0 | 5.0 | 7.6 | 7.6 | | | |
| | Weight (g) | 27.3 | 27.3 | 27.3 | 20.8 | 20.7 | 27.3 | 27.2 | | | |
| Core | Diameter (mm) | 38.7 | 38.7 | 38.7 | 38.7 | 38.6 | 38.7 | 38.6 | | | |
| | Weight (g) | 35.0 | 35.0 | 35.0 | 35.2 | 34.9 | 35.0 | 35.1 | | | |
| | Deflection (mm) | 2.9 | 3.5 | 2.9 | 3.5 | 4.3 | 2.9 | 3.2 | | | |
| | Initial velocity (m/s) | 77.9 | 77.6 | 77.9 | 77.6 | 77.3 | 77.9 | 77.6 | 77.4 | 77.4 | 77.5 |
| Core surface hardness (JIS-C) | Distance from center | 0% JIS-C | | | | | | | | | |
| | | 58 | 51 | 58 | 52 | 48 | 58 | 63 | 64 | 61 | 58 |
| | 10% JIS-C | 57 | 52 | 57 | 53 | 50 | 57 | 63 | 64 | 62 | 60 |
| | 20% JIS-C | 60 | 54 | 60 | 55 | 51 | 60 | 65 | 64 | 62 | 62 |
| | 30% JIS-C | 63 | 56 | 63 | 58 | 54 | 63 | 67 | 65 | 63 | 64 |
| | 40% JIS-C | 66 | 57 | 66 | 62 | 56 | 66 | 71 | 67 | 65 | 65 |
| | 50% JIS-C | 68 | 59 | 68 | 64 | 57 | 68 | 73 | 68 | 66 | 67 |
| | 60% JIS-C | 75 | 70 | 75 | 64 | 57 | 75 | 77 | 71 | 70 | 69 |
| | 70% JIS-C | 77 | 74 | 77 | 67 | 62 | 77 | 76 | 76 | 77 | 71 |
| | 80% JIS-C | 82 | 79 | 82 | 82 | 81 | 82 | 81 | 84 | 84 | 72 |
| | 90% JIS-C | 85 | 82 | 85 | 85 | 83 | 85 | 83 | 87 | 85 | 71 |
| | 100% JIS-C | 91 | 88 | 91 | 91 | 88 | 91 | 90 | 91 | 89 | 77 |
| | Distance from center (Shore D) | 0% Shore D | 31 | 28 | 31 | 28 | 27 | 31 | 41 | 42 | 39 | 34 |
| | 10% Shore D | 30 | 28 | 30 | 29 | 26 | 30 | 41 | 41 | 38 | 34 |
| | 20% Shore D | 32 | 29 | 32 | 30 | 27 | 32 | 41 | 41 | 39 | 35 |
| | 30% Shore D | 33 | 30 | 33 | 31 | 28 | 33 | 42 | 41 | 39 | 36 |
| | 40% Shore D | 35 | 30 | 35 | 33 | 29 | 35 | 44 | 42 | 40 | 36 |
| | 50% Shore D | 37 | 31 | 37 | 34 | 30 | 37 | 45 | 41 | 40 | 38 |
| | 60% Shore D | 44 | 38 | 44 | 34 | 30 | 44 | 48 | 42 | 42 | 39 |
| | 70% Shore D | 47 | 44 | 47 | 38 | 31 | 47 | 47 | 47 | 49 | 41 |
| | 80% Shore D | 53 | 49 | 53 | 50 | 47 | 53 | 51 | 57 | 56 | 43 |
| | 90% Shore D | 57 | 52 | 57 | 55 | 51 | 57 | 55 | 61 | 59 | 42 |
| | 100% Shore D | 64 | 60 | 64 | 63 | 60 | 64 | 64 | 64 | 61 | 44 |
| Hardness ratio | 0% JIS-C/Shore D | 1.88 | 1.82 | 1.88 | 1.86 | 1.80 | 1.88 | 1.54 | 1.50 | 1.56 | 1.73 |
| | 10% JIS-C/Shore D | 1.90 | 1.84 | 1.90 | 1.80 | 1.89 | 1.90 | 1.55 | 1.58 | 1.62 | 1.75 |
| | 20% JIS-C/Shore D | 1.89 | 1.88 | 1.89 | 1.85 | 1.91 | 1.89 | 1.59 | 1.56 | 1.59 | 1.75 |
| | 30% JIS-C/Shore D | 1.89 | 1.89 | 1.89 | 1.85 | 1.95 | 1.89 | 1.61 | 1.59 | 1.62 | 1.76 |
| | 40% JIS-C/Shore D | 1.91 | 1.93 | 1.91 | 1.85 | 1.96 | 1.91 | 1.63 | 1.61 | 1.64 | 1.78 |
| | 50% JIS-C/Shore D | 1.85 | 1.92 | 1.85 | 1.91 | 1.93 | 1.85 | 1.63 | 1.65 | 1.66 | 1.76 |
| | 60% JIS-C/Shore D | 1.70 | 1.85 | 1.70 | 1.89 | 1.94 | 1.70 | 1.61 | 1.69 | 1.65 | 1.75 |
| | 70% JIS-C/Shore D | 1.63 | 1.68 | 1.63 | 1.78 | 1.98 | 1.63 | 1.61 | 1.64 | 1.57 | 1.73 |
| | 80% JIS-C/Shore D | 1.56 | 1.60 | 1.56 | 1.63 | 1.71 | 1.56 | 1.57 | 1.48 | 1.49 | 1.70 |
| | 90% JIS-C/Shore D | 1.50 | 1.57 | 1.50 | 1.55 | 1.63 | 1.50 | 1.53 | 1.42 | 1.45 | 1.71 |
| | 100% JIS-C/Shore D | 1.43 | 1.47 | 1.43 | 1.43 | 1.47 | 1.43 | 1.41 | 1.43 | 1.46 | 1.73 |
| Intermediate layer material | Material | No. 1 | No. 1 | No. 2 | No. 1 | No. 1 | No. 1 | No. 1 | No. 1 | No. 1 | |
| | Thickness (mm) | 1.2 | 1.2 | 1.2 | 1.2 | 1.2 | 1.2 | 1.2 | 1.2 | 1.2 | |
| | weight (g) | 5.6 | 5.6 | 5.6 | 5.5 | 5.7 | 5.6 | 5.6 | 5.6 | 5.6 | |
| | Material hardness (Shore D) | 64 | 64 | 66 | 64 | 64 | 64 | 64 | 64 | 64 | |
| Intermediate layer-encased sphere | Diameter (mm) | 41.0 | 41.0 | 41.0 | 41.0 | 41.0 | 41.0 | 41.0 | 41.0 | 41.0 | |
| | Weight (g) | 40.7 | 40.6 | 40.6 | 40.7 | 40.6 | 40.7 | 40.7 | 40.7 | 40.6 | |
| | Deflection (mm) | 2.5 | 2.9 | 2.4 | 2.8 | 3.3 | 2.5 | 2.8 | 2.5 | 3.0 | |
| | Surface hardness JIS-C | 98 | 98 | 99 | 98 | 98 | 98 | 98 | 98 | 97 | |
| | Shore D | 68 | 68 | 71 | 69 | 68 | 68 | 68 | 68 | 68 | |
| | Initial velocity (m/s) | 78.3 | 78.2 | 78.5 | 78.3 | 78.1 | 78.3 | 78.0 | 78.1 | 77.9 | |
| Cover material | Material | No. 3 | No. 3 | No. 3 | No. 3 | No. 3 | No. 3 | No. 3 | No. 3 | No. 3 | No. 4 |
| | Thickness (mm) | 0.8 | 0.8 | 0.8 | 0.8 | 0.8 | 0.8 | 0.8 | 0.8 | 0.8 | 1.7 |
| | Weight (g) | 5.0 | 5.0 | 5.0 | 5.0 | 5.0 | 5.0 | 5.0 | 4.9 | 4.9 | 8.5 |
| | Material hardness (Shore D) | 47 | 47 | 47 | 47 | 47 | 47 | 47 | 47 | 47 | 54 |

TABLE 4-continued

| | | Working Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Ball | Diameter (mm) | 42.7 | 42.7 | 42.7 | 42.7 | 42.7 | 42.7 | 42.7 | 42.7 | 42.7 | 42.7 |
| | Weight (g) | 45.5 | 45.5 | 45.5 | 45.5 | 45.5 | 45.5 | 45.7 | 45.5 | 45.5 | 45.3 |
| | Deflection (mm) | 2.3 | 2.6 | 2.3 | 2.5 | 3.0 | 2.3 | 2.5 | 2.4 | 2.8 | 3.5 |
| | Surface hardness (Shore D) | 59 | 59 | 60 | 59 | 59 | 59 | 59 | 59 | 59 | 59 |
| | Initial velocity (m/s) | 77.5 | 77.4 | 77.8 | 77.5 | 77.3 | 77.5 | 77.3 | 77.3 | 77.2 | 77.3 |
| | Dimples | Family A | Family A | Family A | Family A | Family A | Family B | Family A | Family A | Family A | Family A |
| Core surface hardness − Core center hardness (JIS-C) | | 34 | 37 | 34 | 38 | 40 | 34 | 27 | 28 | 28 | 18 |
| Surface hardness difference (intermediate layer − inner core layer), JIS-C | | 29 | 36 | 30 | 30 | 38 | 29 | 24 | 6 | 8 | — |
| Core hardness ratio: Hardness ratio at 0% − Hardness ratio at 100% | | 0.45 | 0.35 | 0.45 | 0.43 | 0.34 | 0.45 | 0.13 | 0.08 | 0.10 | 0.00 |
| Core hardness ratio: Hardness ratio at 50% − Hardness ratio at 100% | | 0.42 | 0.46 | 0.42 | 0.48 | 0.46 | 0.42 | 0.22 | 0.22 | 0.20 | 0.02 |

The flight performance (W#1 and I#6) and performance on approach shots of the golf balls obtained in the respective Working Examples and Comparative Examples were evaluated according to the criteria indicated below. The results are shown in Table 5. The measurements were all carried out in a 23° C. environment.

Flight Performance (1)

A driver (W#1) was mounted on a golf swing robot and the distance traveled by the ball when struck at a head speed of 45 m/s was measured and rated according to the criteria shown below. The club used was the Tour B XD-3, a driver (2016 model; loft angle, 9.5°) manufactured by Bridgestone Sports Co., Ltd. In addition, using an apparatus for measuring the initial conditions, the spin rate was measured immediately after the ball was similarly struck.

Rating Criteria
  Good: Total distance was 238 m or more
  NG: Total distance was less than 238 m Flight Performance (2)

A 6-iron (I#6) was mounted on a golf swing robot and the distance traveled by the ball when struck at a head speed of 40 m/s was measured and rated according to the criteria shown below. The club used was the Tour B X-CB, a 6-iron manufactured by Bridgestone Sports Co., Ltd. In addition, using an apparatus for measuring the initial conditions, the spin rate was measured immediately after the ball was similarly struck.

Rating Criteria
  Good: Total distance was 174 m or more
  NG: Total distance was less than 174 m Spin Performance on Approach Shots A sand wedge (SW) was mounted on a golf swing robot and the amount of spin by the ball when struck at a head speed of 20 m/s was rated according to the criteria shown below. The club used was the Tour B XW-1, a sand wedge manufactured by Bridgestone Sports Co., Ltd. The spin rate was measured using an apparatus for measuring the initial conditions immediately after the ball was struck.

Rating Criteria:
  Good: Spin rate was 6,000 rpm or more
  NG: Spin rate was less than 6,000 rpm

TABLE 5

| | | | Working Example | | | | | | Comparative Example | | | |
|---|---|---|---|---|---|---|---|---|---|---|---|---|
| | | | 1 | 2 | 3 | 4 | 5 | 6 | 1 | 2 | 3 | 4 |
| Flight performance | W#1 HS, 45 m/s | Spin rate (rpm) | 2,890 | 2,685 | 2,880 | 2,719 | 2,505 | 2,892 | 3,020 | 2,868 | 2,606 | 2,868 |
| | | Total distance (m) | 245 | 242 | 246 | 242 | 241 | 246 | 237 | 237 | 236 | 235 |
| | | Rating | good | good | good | good | good | good | NG | NG | NG | NG |
| | I#6 HS 42 m/s | Spin rate (rpm) | 5,329 | 4,743 | 5,309 | 4,741 | 4,315 | 5,326 | 5,629 | 5,155 | 4,664 | 5,009 |
| | | Total distance (m) | 175 | 179 | 176 | 174 | 178 | 176 | 173 | 173 | 177 | 172 |
| | | Rating | good | good | good | good | good | good | NG | NG | good | NG |
| Controllability on approach shots | HS, 20 m/s | Spin rate (rpm) | 6,461 | 6,343 | 6,432 | 6,334 | 6,108 | 6,457 | 6,431 | 6,359 | 5,950 | 4,559 |
| | | Rating | good | good | good | good | good | good | good | good | NG | NG |

As demonstrated by the results in Table 5, the golf balls of Comparative Examples 1 to 4 were inferior in the following respects to the golf balls according to the present invention that were obtained in the Working Examples.

In Comparative Example 1, the core hardness distribution (core cross-sectional hardness ratio at 0%) was not as specified in the invention, as a result of which the spin rates on full shots with a driver (W#1) and an iron were too high and the ball did not achieve a good distance.

In Comparative Example 2, the core was a single-layer core and the core hardness distribution (core cross-sectional hardness ratio at 0%) was not as specified in the invention, as a result of which the spin rates on full shots with a driver (W#1) and an iron were too high and the ball did not achieve a good distance.

In Comparative Example 3, the core was a single-layer core and the core hardness distribution (core cross-sectional hardness ratio at 0%) was not as specified in the invention, as a result of which the spin rate on full shots with a driver (W#1) was too high and the ball did not achieve a good distance. Moreover, the spin rate on approach shots was small, resulting in a poor controllability.

In Comparative Example 4, the core was a single-layer core and the core hardness distribution (core cross-sectional hardness ratio at 100%) was not as specified in the invention, as a result of which the spin rates on full shots with a driver (W#1) and an iron were too high and the ball did not achieve a good distance. Moreover, the spin rate on approach shots was small, resulting in a poor controllability.

Japanese Patent Application No. 2017-246131 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a two-layer core consisting of an inner core layer and an outer core layer and a cover of one or more layer, wherein the inner core layer and outer core layer are each formed of a rubber composition made up primarily of a base rubber; the inner core layer has a diameter of not more than 30 mm; and, letting a center point in a cross-section of the two-layer core be 0% and a surface of the two-layer core be 100%, a core cross-sectional hardness ratio (JIS-C hardness/Shore D hardness) at 0% is at least 1.70 and a core cross-sectional hardness ratio (JIS-C hardness/Shore D hardness) at 100% is not more than 1.65; and wherein letting the core cross-sectional hardness ratio (JIS-C hardness/Shore D hardness) at a point 50% of the distance from the center point of the two-layer core cross-section to the core surface be T50, the value T50-T100 is at least 0.25.

2. The golf ball of claim 1, wherein the hardness difference between the surface and center of the two-layer core, expressed in terms of JIS-C hardness, is at least 29.

3. The golf ball of claim 1 wherein, letting the core cross-sectional hardness ratio (JIS-C hardness/Shore D hardness) at 0% be T0 and the core cross-sectional hardness ratio (JIS-C hardness/Shore D hardness) at 100% be T100, the value T0-T100 is at least 0.25.

4. The golf ball of claim 1 wherein, at any point up to a point 50% of the distance from the center point of the two-layer core cross-section to the core surface, the core cross-sectional hardness ratio (JIS-C hardness/Shore D hardness) T0-50 is at least 1.70.

5. The golf ball of claim 1 wherein, at any point up to the surface (100% point) from a point 90% of the distance from the center point of the two-layer core cross-section to the core surface, the core cross-sectional hardness ratio (JIS-C hardness/Shore D hardness) T90-100 is not more than 1.65.

6. The golf ball of claim 1, wherein the rubber composition for the inner core layer contains two or more organic peroxides and the rubber composition for the outer core layer contains one organic peroxide.

7. The golf ball of claim 1, wherein the rubber composition for the inner core layer includes from 5 to 25 parts by weight of an unsaturated carboxylic acid metal salt per 100 parts by weight of the base rubber and the rubber composition for the outer core layer includes from 26 to 50 parts by weight of an unsaturated carboxylic acid metal salt per 100 parts by weight of the base rubber.

8. The golf ball of claim 1, wherein the two-layer core is encased by an intermediate layer, which core and intermediate layer together comprise an intermediate layer-encased sphere, and a surface hardness of the intermediate layer-encased sphere and a surface hardness of the inner core layer have a difference therebetween, expressed in terms of JIS-C hardness, which is at least 25.

9. The golf ball of claim 8, wherein the intermediate layer is formed of a material containing an ionomer resin having a high acid content of at least 16 wt%.

10. The golf ball of claim 1, wherein the outermost layer of the cover has numerous dimples formed on a surface thereof, the ball has arranged thereon at least one dimple with a cross-sectional shape that is described by a curved line or a combination of straight and curved lines and is specified by steps (i) to (iv) below, and the total number of dimples is from 250 to 380:

(i) letting the foot of a perpendicular drawn from a deepest point of the dimple to an imaginary plane defined by a peripheral edge of the dimple be a dimple center and a straight line that passes through the dimple center and any one point on the edge of the dimple be a reference line;

(ii) dividing a segment of the reference line from the dimple edge to the dimple center into at least 100 points and computing a distance ratio for each point when the distance from the dimple edge to the dimple center is set to 100%;

(iii) computing a dimple depth ratio at every 20% from 0 to 100% of the distance from the dimple edge to the dimple center; and (iv) at the depth ratios in dimple regions 20 to 100% of the distance from the dimple edge to the dimple center, determining a change in depth ΔH every 20% of said distance and designing a dimple cross-sectional shape such that the change ΔH is at least 6% and not more than 24% in all regions corresponding to from 20 to 100% of said distance.

11. A golf ball comprising a two-layer core consisting of an inner core layer and an outer core layer and a cover of one or more layer, wherein the inner core layer and outer core layer are each formed of a rubber composition made up primarily of a base rubber; the inner core layer has a diameter of not more than 30 mm; and, letting a center point in a cross-section of the two-layer core be 0% and a surface of the two-layer core be 100%, the core cross-sectional hardness ratio (JIS-C hardness/Shore D hardness) at 0% is at least 1.70 and the core cross-sectional hardness ratio (JIS-C hardness/Shore D hardness) at 100% is not more than 1.65;

wherein the two-layer core is encased by an intermediate layer, which core and intermediate layer together comprise an intermediate layer-encased sphere, and a surface hardness of the intermediate layer-encased sphere and a surface hardness of the inner core layer have a difference therebetween, expressed in terms of JIS C hardness, which is at least 25.

12. The golf ball of claim 11, wherein the hardness difference between the surface and center of the two-layer core, expressed in terms of JIS-C hardness, is at least 29.

13. The golf ball of claim 11, wherein, letting the core cross-sectional hardness ratio (JIS-C hardness/Shore D hardness) at 0% be T0 and the core cross-sectional hardness ratio (JIS-C hardness/Shore D hardness) at 100% be T100, the value T0-T100 is at least 0.25.

14. The golf ball of claim 11, wherein, at any point up to a point 50% of the distance from the center point of the two-layer core cross-section to the core surface, the core cross-sectional hardness ratio (JIS-C hardness/Shore D hardness) T0-50 is at least 1.70.

15. The golf ball of claim 11, wherein, at any point up to the surface (100% point) from a point 90% of the distance from the center point of the two-layer core cross-section to the core surface, the core cross-sectional hardness ratio (JIS-C hardness/Shore D hardness) T90-100 is not more than 1.65.

16. The golf ball of claim 11, wherein the rubber composition for the inner core layer contains two or more organic peroxides and the rubber composition for the outer core layer contains one organic peroxide.

17. The golf ball of claim 11, wherein the rubber composition for the inner core layer includes from 5 to 25 parts by weight of an unsaturated carboxylic acid metal salt per 100 parts by weight of the base rubber and the rubber composition for the outer core layer includes from 26 to 50 parts by weight of an unsaturated carboxylic acid metal salt per 100 parts by weight of the base rubber.

18. The golf ball of claim 11, wherein the intermediate layer is formed of a material containing an ionomer resin having a high acid content of at least 16 wt%.

19. The golf ball of claim 11, wherein the outermost layer of the cover has numerous dimples formed on a surface thereof, the ball has arranged thereon at least one dimple with a cross-sectional shape that is described by a curved line or a combination of straight and curved lines and is specified by steps (i) to (iv) below, and the total number of dimples is from 250 to 380:

(i) letting the foot of a perpendicular drawn from a deepest point of the dimple to an imaginary plane defined by a peripheral edge of the dimple be a dimple center and a straight line that passes through the dimple center and any one point on the edge of the dimple be a reference line;

(ii) dividing a segment of the reference line from the dimple edge to the dimple center into at least 100 points and computing a distance ratio for each point when the distance from the dimple edge to the dimple center is set to 100%;

(iii) computing a dimple depth ratio at every 20% from 0 to 100% of the distance from the dimple edge to the dimple center; and (iv) at the depth ratios in dimple regions 20 to 100% of the distance from the dimple edge to the dimple center, determining a change in depth $\Delta H$ every 20% of said distance and designing a dimple cross-sectional shape such that the change $\Delta H$ is at least 6% and not more than 24% in all regions corresponding to from 20 to 100% of said distance.

* * * * *